(12) United States Patent
Vattement

(10) Patent No.: US 6,939,834 B1
(45) Date of Patent: Sep. 6, 2005

(54) GROUT FOR MAKING WATERTIGHT SCREENS

(75) Inventor: Hubert Vattement, Montereau (FR)

(73) Assignee: Compagnie du Sol, Nanterre (FR)

( * ) Notice: Subject to any disclaimer, the term of this patent is extended or adjusted under 35 U.S.C. 154(b) by 689 days.

(21) Appl. No.: 09/691,325

(22) Filed: Oct. 18, 2000

(30) Foreign Application Priority Data

Oct. 21, 1999 (FR) .................................. 99 13126

(51) Int. Cl.[7] .......................... C09K 3/00; C04B 28/08
(52) U.S. Cl. .................. 507/269; 507/906; 106/789; 106/790; 106/714
(58) Field of Search ..................... 166/292, 293; 106/789, 790, 714; 507/269, 906

(56) References Cited

U.S. PATENT DOCUMENTS

| | | | |
|---|---|---|---|
| 5,309,997 A | | 5/1994 | Nahm et al. |
| 5,309,999 A | * | 5/1994 | Cowan et al. ............. 166/293 |
| 5,311,944 A | * | 5/1994 | Cowan et al. ............. 166/292 |
| 5,343,952 A | * | 9/1994 | Cowan et al. ............. 166/295 |
| 5,361,842 A | * | 11/1994 | Hale et al. ................ 166/293 |
| 5,447,197 A | * | 9/1995 | Rae et al. ................ 166/293 |
| 5,673,753 A | * | 10/1997 | Hale et al. ................ 166/293 |
| 6,068,055 A | * | 5/2000 | Chatterji et al. ............ 166/293 |

FOREIGN PATENT DOCUMENTS

| | | |
|---|---|---|
| DE | 659703 | 6/1995 |
| FR | 434112 | 6/1991 |
| FR | 545827 | 6/1993 |
| WO | WO 88/05425 | 7/1988 |
| WO | WO 94/09250 | 4/1994 |

OTHER PUBLICATIONS

European Search Report dated Nov. 15, 2000.

* cited by examiner

*Primary Examiner*—Philip C. Tucker
(74) *Attorney, Agent, or Firm*—Merchant & Gould P.C.

(57) ABSTRACT

The invention relates to a grout for making watertight screens which comprises a mixture of water, natural or modified clay, specific blast furnace slag and an activating agent.

The invention also relates to a process which makes use of said grout, as well as the use of a specific blast furnace slag for preparing said grout.

7 Claims, 1 Drawing Sheet

GROUT FOR MAKING WATERTIGHT SCREENS

The present invention relates to the field of construction and building. More specifically, the invention relates to a grout for making watertight screens, as well as to a process which makes use of said grout.

It is known that ground blast furnace slag behaves as a real cement when a base such as sodium hydroxide or clinker for example is added thereto.

Thus, usually, mixtures of the following types are found on the market:
slag+clinker in well defined proportions (Cement CLK CEM III/C, CHF CEM III/A or B), or
granulated slag+lime, intended for road works.

Making watertight screens is done by direct perforation with bentonite cement grout as excavation fluid. The perforation is done continuously from which comes the necessity of having a material which does not harden too quickly so as to prevent losses of grout on the excavation cuttings as well as the evacuation of grout which might have hardened prematurely. This specific method for watertight screens necessitates, with the materials which are currently available, the use of setting retarders and hardening retarders.

A good watertightness is in fact sought after during the making of watertight screens. The resistance is in general low and does not represent an essential criterion. In general, slag cements are used the composition of which generates grouts the rheology of which is difficult to control. The use of retarder additives is thus necessary to obtain a manoeuvrability which is compatible with the perforation with a grout.

The aim of the invention is to remedy these drawbacks. Thus, the objective of the invention is grouts which are particularly adapted to the making of watertight screens, in particular grouts which do not necessitate the addition of retarders.

Thus, the invention relates to a grout for making watertight screens which comprises a mixture of water, a natural clay or a modified clay such as bentonite, a blast furnace slag and an activating agent.

Figure 1:
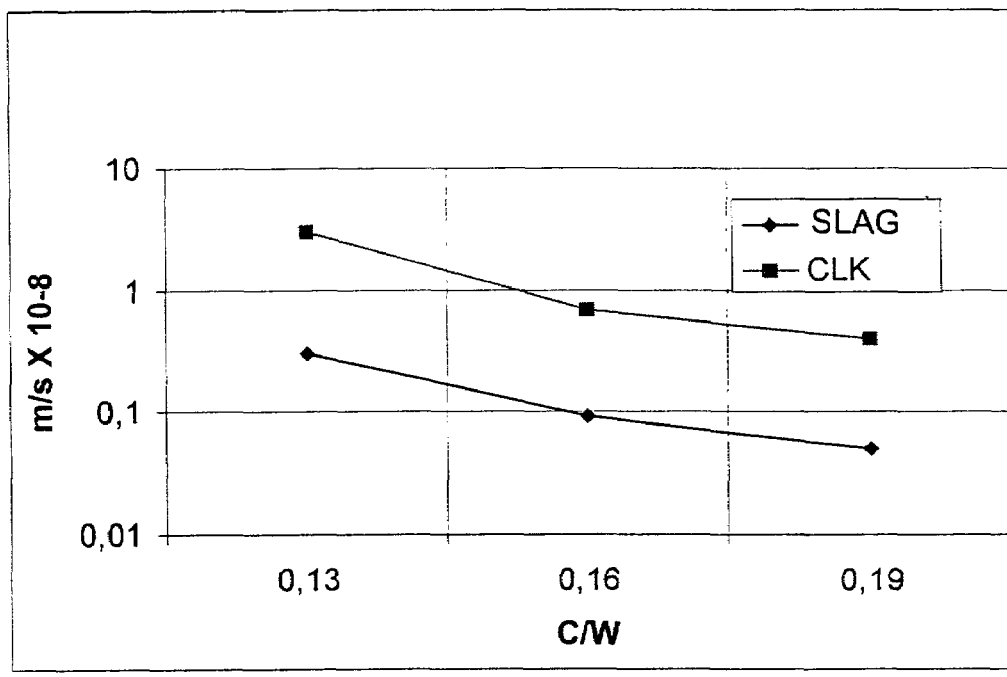
FIG. 1 shows the evolution of the permeability as a function of the cement/water ratio.

In accordance with the invention, said slag comprises grains the maximum size of which is between about 50 $\mu$m and about 100 $\mu$m, preferably equal to about 80 $\mu$m. The slag preferably has a Blaine specific surface area of about 2,500 to about 4,500 cm$^2$/g.

Although the nature of the blast furnace slag is not particularly critical, it is preferable that it be of the basic type and that the CaO/SiO$_2$ weight ratio be between about 1.10 and about 1.35. A material which comprises 33 to 40% SiO$_2$, 8 to 16% Al$_2$O$_3$, 39 to 44% CaO, and 4 to 9% MgO (in percentages by weight) as main components can be cited as an example of a slag which can be used within the context of the present invention.

Furthermore, it is also preferable that the chemical modulus of the slag (CaO content (%)×Al$_2$O$_3$ content (%)) be greater than about 500.

The activating agent enables the setting of the slag and is preferably a basic activating agent such as sodium hydroxide, potassium hydroxide, sodium or potassium (bi)carbonate, gypsum, quicklime, slaked lime or a mixture of these compounds. It is also possible to use Portland cement as activating agent.

In general, the amount of activating agent is between about 1% and about 10% by weight, with respect to the weight of the slag. An amount of activating agent equal to about 5% by weight is particularly advantageous.

Advantageously, such a grout has a cement/water weight ratio (C/W) of between about 0.1 and about 0.25.

Under these circumstances, it is possible to obtain a grout having the following properties:
a greater resistance for a same cement/water ratio,
a better permeability at an equivalent dry matter content (as FIG. 1 shows, which represents the evolution of the permeability as a function of the C/W ratio), and
a very slow evolution of the rigidity which is well adapted to the direct perforation with a grout. The low reactivity of the system makes it possible to totally do without the use of retarders. The suppression of such additives enables the ground water to be respected by eliminating organic pollutant waste.

This grout can be used for underground work in contact with the ground water by virtue of its non-pollutant character, and it can be used for injection works and in the making of plastic concrete watertight screens.

The grout is prepared on the drilling site by mixing the components defined supra.

The invention will be better understood with the aid of the following Examples, which are given in a purely illustrative manner.

The following constituents are used in these Examples:
bentonite slurry: mixture of 1,000 l of water and 45 kg of sodic bentonite
slag: basic blast furnace slag having a CaO/SiO$_2$ weight ratio equal to 1.19 and a chemical modulus equal to 515
activating agent: CPA CEM I
retarder: mixed calcium/ammonium lignosulphate
accelerator: sodium silicate 35/37 °B

EXAMPLE 1

Influence of the Maximum Grain Size of the Slag Upon the Manoeuvrability Time of the Grout

| Grout manoeuvrability time | Slag 40 $\mu$m 5 hours | Slag 80 $\mu$m 5 hours | Slag 120 $\mu$m 5 hours |
|---|---|---|---|
| Bentonite slurry | 941 l | 941 l | 941 l |
| Slag | 166.25 kg | 166.25 kg | 166.25 kg |
| Activating agent | 8.75 kg | 8.75 kg | 8.75 kg |
| Retarder | 3 l | 0 | 0 |
| accelerator | 0 | 0 | 4 l |

EXAMPLE 2

Formulations for Watertight Wall

|  | invention | comparative |
|---|---|---|
| Bentonite slurry | 941 l | 941 l |
| Slag* | 166 kg |  |

-continued

|  | invention | comparative |
|---|---|---|
| Activator (CPA CEM I) | 9 kg |  |
| CLK |  | 175 kg |
| Retarder |  | 2 l |
| Manoeuvrability time | 5 h | 5 h |
| Resistance 28 days | 1.2 MPa | 1 MPa |
| Permeability | $5 \cdot 10^{-10}$ m/s | $4 \cdot 10^{-9}$ m/s |

*the slag has a continuous particle size ranging from 0 to 80 μm and a Blaine specific surface area equal to 4500

The grout in accordance with the invention, without retarder, has a manoeuvrability time which is identical to conventional grout comprising clinker (CLK) and a retarder, as well as a better resistance and a better permeability than conventional grout.

What is claimed is:

1. A grout for watertight screens, which consists of water, a natural or modified clay, a blast furnace slag having a maximum grain size of between about 50 μm and about 100 μm and a Portland cement as an activating agent, wherein said grout has a cement/water ratio of between 0.1 and 0.25.

2. The grout according to claim 1, in which the slag has a maximum grain size equal to about 80 μm.

3. The grout according to claim 1, in which the slag has a $CaO/SiO_2$ weight ratio of between 1.10 and 1.35.

4. The grout according to claim 1, in which the slag has a chemical modulus of greater than about 500.

5. The grout according to claim 1, in which the modified clay is bentonite.

6. The grout according to claim 1, in which the amount of Portland cement is about 1% to about 10% by weight with respect to the weight of the blast furnace slag.

7. The grout of claim 1, in which the slag has a Blaine specific surface area of about 2,500 to about 4,500 cm²/g.

* * * * *